United States Patent
Yen et al.

(10) Patent No.: US 7,668,369 B2
(45) Date of Patent: Feb. 23, 2010

(54) USING CAMERA METADATA TO CLASSIFY IMAGES INTO SCENE TYPE CLASSES

(75) Inventors: Jonathan Yen, San Jose, CA (US); Peng Wu, Palo Alto, CA (US); Daniel Tretter, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 713 days.

(21) Appl. No.: 11/411,481

(22) Filed: Apr. 26, 2006

(65) Prior Publication Data

US 2007/0253699 A1  Nov. 1, 2007

(51) Int. Cl.
   *G06K 9/00* (2006.01)
   *G06K 9/62* (2006.01)

(52) U.S. Cl. ................................. 382/170

(58) Field of Classification Search ......... 382/168–170, 382/224–228, 162, 165; 348/231.1–231.99; 345/589
   See application file for complete search history.

(56) References Cited

U.S. PATENT DOCUMENTS

| | | |
|---|---|---|
| 6,707,950 B1 | 3/2004 | Burns et al. |
| 6,833,865 B1 | 12/2004 | Fuller et al. |
| 6,977,679 B2* | 12/2005 | Tretter et al. ............ 348/231.2 |
| 7,202,873 B2* | 4/2007 | Akahori ..................... 345/589 |
| 7,555,165 B2* | 6/2009 | Luo et al. .................. 382/224 |
| 2002/0140843 A1 | 10/2002 | Tretter et al. |
| 2004/0258308 A1 | 12/2004 | Sadovsky et al. |
| 2005/0104976 A1 | 5/2005 | Currans |
| 2005/0105776 A1 | 5/2005 | Luo et al. |

OTHER PUBLICATIONS

A. Vailaya et al., "On image classification: City vs. landscape," in IEEE Workshop on Content-Based Access of Image and Video Libraries, Santa Barbara, CA, Jun. 1998.
Martin Szummer et al., Indoor-Outdoor Image Classification, IEEE International Workshop on Content-based Access of Image and Video Databases, 10 pages (1998).
Liu et al., "Boosting image classification with LDA-based feature combination for digital photograph management," Patt. Recog., GB, vol. 38, No. 6, Jun. 2005, pp. 887-901.
Qiu et al., "Compressing histogram representations for automatic colour photo categorization." Patt. Recog., GB, vol. 37, No. 11, Nov. 2004, pp. 2177-2193.
Edgar Osuna et al., "Support vector machines: Training and applications," Technical Report AIM-1602, Massachusets Institute of Technology, 1997.
"Beyond Film," HP Newsroom, Hewlett-Packard Company, www.hpl.hp.com/news/2004/apr-jun/beyond_film.html (Jun. 2004).

* cited by examiner

*Primary Examiner*—Sherali Ishrat

(57) ABSTRACT

In one aspect, a metadata-based classification result is obtained based on metadata associated with an image. A histogram-based classification result is determined based on a histogram of intensity values derived from the image. The image is classified into a scene type class based on the metadata-based classification result and the histogram-based classification result. In another aspect, a first condition is applied on a first one of metadata associated with an image corresponding to a measure of amount of light received in capturing the image to obtain a first metadata-based classification result. A second condition is applied on a second one of the metadata corresponding to a measure of brightness of the image to obtain a second metadata-based classification result. The image is classified into a scene type class based on the first and second metadata-based classification results.

17 Claims, 6 Drawing Sheets

USING CAMERA METADATA TO CLASSIFY IMAGES INTO SCENE TYPE CLASSES

BACKGROUND

Automatic scene classification of images may be used in a wide variety of applications, including computer vision systems and media asset organization and retrieval systems. Many automatic scene classification systems classify images based at least in part on a content-based analysis of the images. Each image typically is represented by a set of low-level features (e.g., texture, color, and shape) that are extracted from the image. The images are classified by applying the corresponding features into a classifier, such as a Support Vector Machine, which has been trained on pre-labeled images in a target scene type class (e.g., indoor/outdoor, city/landscape, and sunset/mid-day). Based on the input features, the classifier determines whether or not new image instances should be classified into the target scene type class.

Some automatic scene classification systems augment content-based scene classification information with metadata that is associated with the images to improve the accuracy with which images are classified into various scene type classes. Such metadata corresponds to structured data that describes information relating to the images, such as characteristics of the images or conditions occurring at or near the times the images were captured. Most digital cameras, for example, encode camera metadata in the header (typically an EXIF header) of the image file containing the corresponding image data. Exemplary types of camera metadata include data/time stamps, whether or not a flash was used, focal length, exposure time, aperture value, subject distance, and brightness value.

In one automatic scene classification approach, a final estimate of image class is produced from a combination of a metadata-based estimate of image class and a content-based estimate of image class. In this approach, the content-based estimate of image class is obtained by extracting a plurality of color and texture features from image sub-blocks, inputting the features into a Support Vector Machine that generates estimates of image class for each of the sub-blocks, and combining these estimates to produce an overall content-based classification estimate for the entire image.

In general, the content-based scene classification methods described above are computationally intensive and require significant memory resources, making them unsuitable in application environments, such as embedded environments, in which processing and memory resources are significantly constrained. In addition, many of the low level features used in these methods cannot be determined for certain types of scenes, such as night scenes and snow scenes.

What are needed are systems and methods of classifying images into targeted scene type classes that may be implemented within the significant processing and memory constraints of typical embedded application environments. In addition, it would be desirable to have systems and methods that are capable of classifying images into scene type classes for which low-level feature descriptors cannot be determined.

SUMMARY

In one aspect, the invention features an image processing method in accordance with which a metadata-based classification result is obtained based on metadata associated with an image. A histogram-based classification result is determined based on a histogram of intensity values derived from the image. The image is classified into a scene type class based on the metadata-based classification result and the histogram-based classification result.

In another aspect, the invention features an image processing system that includes a metadata-based scene type classifier and a verification classifier. The metadata-based scene type classifier performs an initial classification of an image into a scene type class based on metadata associated with the image. The verification classifier verifies the initial classification of the image into the scene type class based on a histogram of intensity values derived from the image.

In another aspect, the invention features an image processing method in accordance with which a first condition is applied on a first one of metadata associated with an image to obtain a first metadata-based classification result, where the first metadata corresponds to a measure of amount of light received in capturing the image. A second condition is applied on a second one of the metadata corresponding to a measure of brightness of the image to obtain a second metadata-based classification result. The image is classified into a scene type class based on the first and second metadata-based classification results.

Other features and advantages of the invention will become apparent from the following description, including the drawings and the claims.

DETAILED DESCRIPTION

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale. Elements shown with dashed lines are optional elements in the illustrated embodiments incorporating such elements.

I. Overview

The embodiments that are described in detail below leverage information that is readily available in typical imaging application environments (e.g., a digital camera or an optical scanner) to reduce the computational resources and memory resources that are needed to classify images into various scene type classes.

In some implementations, respective conditions are applied on two types of metadata (i.e., a light received metadata and a brightness metadata) that together provide high classification accuracy with respect to scene type classes, such as night scenes and snow scenes, from which image content features, such as color and texture, typically cannot be extracted. These metadata may be determined readily from information that is available in typical imaging application environments. In this way, these implementations reduce the computational and memory resources needed to perform scene classification with respect to scenes that otherwise could not be classified reliably using feature-based cues.

In some implementations, images are classified based on both a metadata-based classification result and a histogram-based classification result. It has been observed that the combination of these classification results enables the incidence of correct classification (i.e., the true positive rate) to be increased without unduly increasing the incidence of false positives.

Due to their efficient use of processing and memory resources, the embodiments that are described in detail below readily may be implemented in application environments, such as embedded environments, which are subject to significant processing and memory constraints.

II. Scene Classification Based on Metadata

A. Introduction

Figure 1:
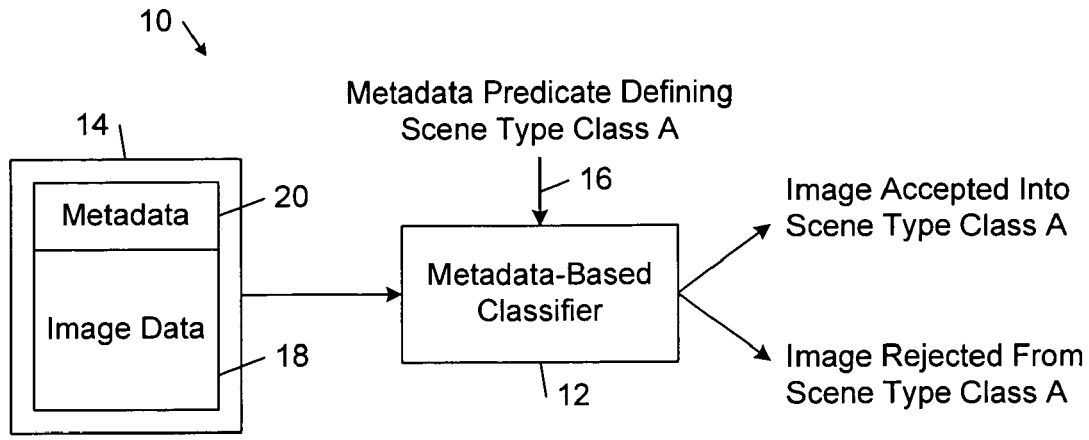
FIG. 1 is a block diagram of an embodiment of a scene classification system that includes a metadata-based classifier.

FIG. 1 shows an embodiment of a scene classification system 10 that includes a metadata-based classifier 12, which classifies a digital image 14 into a particular scene type class (i.e., scene type class A) that is defined by a metadata predicate 16 that defines (or specifies) the scene type class. In operation, the metadata-based classifier 12 determines whether to accept the image 14 into the specified scene type class or to reject the image 14 from the specified scene type class.

The digital image 14 typically is in the form of a digital image file that includes image data 18 and associated metadata 20. The metadata 20 may be embedded in a header (e.g., an EXIF header) of the digital image file or otherwise linked to the digital image file (e.g., stored in a separate data structure that is linked to the digital image file). In general, the metadata may have been recorded during the capture of the corresponding image data 18, later derived from such metadata or from an analysis of the image data 18, or specified by a user. Exemplary types of metadata that may be associated with the image file include collateral metadata and content-based metadata that is extracted automatically from the image data 18. Among the exemplary types of collateral metadata are capture date, capture time, shutter speed, aperture size, lens focal length, flash operation information, white balance information, automatic gain setting information, resolution/image size, degree of compression, file format (e.g., JPEG vs. GIF vs. TIFF vs. RAW formats), shooting mode (e.g., aperture-priority vs. shutter-priority vs. manual control), light metering mode (e.g., center spot vs. weighted vs. evaluative), and special effects (e.g., black & white vs. vivid vs. neutral vs. sepia). Among the exemplary types of metadata that can be derived from the corresponding image data 18 are maximum, minimum, and/or average intensities of the pixels recorded in the image, intensity histogram information, whether the image is overexposed or underexposed, whether the image was taken under natural or artificial lighting (e.g., via estimation of color balance), reduced-resolution or "thumbnail" versions of the image data 18, keyframes, and face recognition information.

The metadata-based classifier 12 is not limited to any particular hardware or software configuration, but rather it may be implemented in any computing or processing environment, including in digital electronic circuitry or in computer hardware, firmware, device driver, or software. For example, in some implementations, the metadata-based classifier may be embedded in the hardware of any one of a wide variety of electronic devices, including desktop and workstation computers, digital still image cameras, digital video cameras, printers, scanners, and portable electronic devices (e.g., mobile phones, laptop and notebook computers, and personal digital assistants).

In some implementations, computer process instructions for implementing the metadata-based classifier 12 and the data it generates are stored in one or more machine-readable media. Storage devices suitable for tangibly embodying these instructions and data include all forms of non-volatile memory, including, for example, semiconductor memory devices, such as EPROM, EEPROM, and flash memory devices, magnetic disks such as internal hard disks and removable hard disks, magneto-optical disks, and CD-ROM.

B. Scene Type Classification Based on Metadata Predicates

As explained above, the metadata-based classifier 12 classifies the digital image 14 based on the metadata predicate 16, which defines the scene type class in terms of at least one condition on the metadata 20 that is associated with the digital image 14. As used herein, the term "predicate" refers to an operator or a function that returns a Boolean value (e.g., true or false). A "metadata predicate" is an operator or a function that returns a Boolean value based on the values of one or more metadata. A "histogram predicate" is an operator or function that returns a Boolean value based on one or more properties or characteristics of a histogram.

Figure 2:
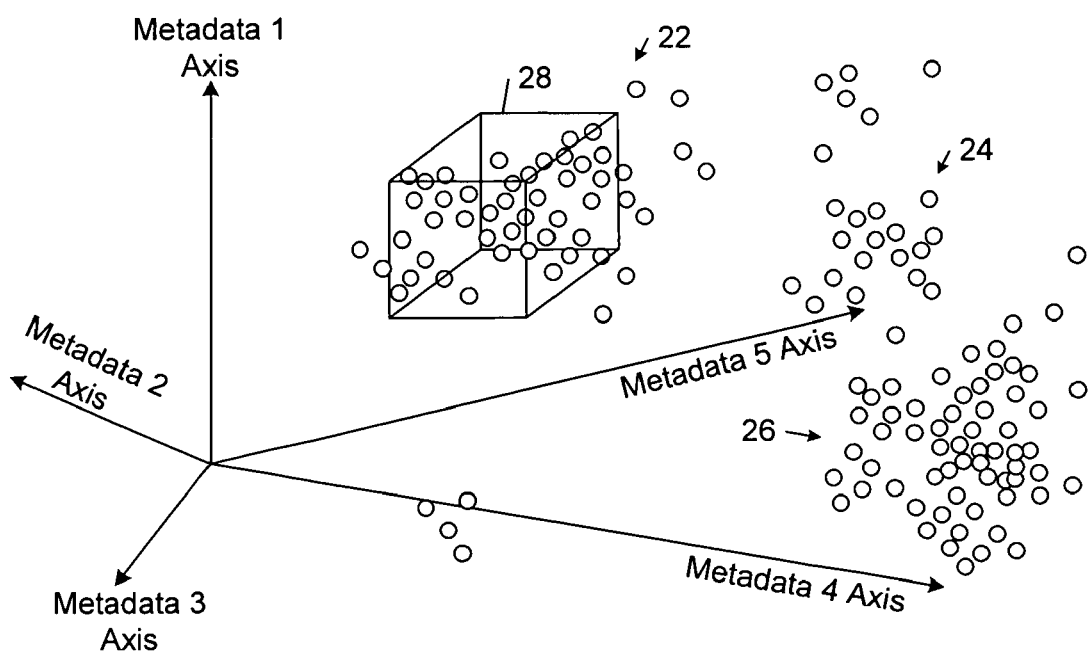
FIG. 2 is a diagrammatic view of a devised population of images mapped into a metadata parameter space.

FIG. 2 shows an exemplary mapping of images (represented by circles) into a devised metadata space that is defined along five dimensions corresponding to five different types of metadata (i.e., Metadata 1, Metadata 2, . . . , Metadata 5). In this derived mapping, the images form three clusters 22, 24, 26 in the devised metadata space. These clusters may be identified using standard data mining techniques (e.g., k nearest neighbor (k-NN) clustering, hierarchical agglomerative clustering, and k-means clustering). In some implementations, relational data mining techniques, such as learning of relational decision trees, relational classification and association rules, and distance based approaches to relational learning and clustering, are used to identify patterns corresponding to the boundaries of regions (e.g., the rectangular box-shaped region 28) that respectively encompass the identified image clusters. The identified boundaries can be translated into metadata predicates, which can be used by the metadata-based classifier 12 to classify images into respective scene type classes.

C. Metadata-Based Classification of Night Scenes

With respect to night scenes, the following metadata predicate ($MP_{Night\_Scene}$) was identified from an analysis of a population of images:

$$MP_{Night\_Scene} = \{Light\_Allowed > \Omega_A \text{ and } Brightness < \Omega_B\} \quad (1)$$

where $\Omega_A$ is an empirically determined threshold for the Light_Allowed metadata value and $\Omega_B$ is an empirically determined threshold for the Brightness metadata value. The metadata predicate $MP_{Night\_Scene}$ that is defined in equation (1) returns a true value for an image X when the Light_Allowed metadata value for X (i.e., Light_Allowed$_X$) is greater than $\Omega_A$ and the Brightness value for X (i.e., Brightness$_X$) is less than $\Omega_B$. Otherwise, the metadata predicate $MP_{Night\_Scene}$ returns a false value.

The Light_Allowed metadata is a derived parameter that corresponds to a measure of light received in capturing the image. In one exemplary implementation, the Light_Allowed metadata is computed in accordance with equation (2):

$$\text{Light\_Allowed} = \frac{\text{Exposure\_Time}}{(\text{F\_Number})^2} \quad (2)$$

where the Exposure_Time is the duration of the capture period over which the imaging device collects light for the corresponding image, and the F_Number is the f-number (or focal ratio) of the optical system used to capture the corresponding image. The F_Number corresponds to the ratio of the effective focal length of the lens and the diameter of the entrance pupil.

The Brightness metadata corresponds to a measure of the amount of light reflected from the scene in the corresponding image. The Brightness parameter may be determined by the imaging system in a wide variety of different ways. For example, in the illustrated embodiments, the Brightness metadata value is calculated as the logarithm base 2 of the average luminance of a region of the imaged scene measured in foot-lambert, which is a unit of luminance or photometric brightness, equal to the luminance of a surface emitting a luminous flux of one lumen per square foot (i.e., the luminance of a perfectly reflecting surface receiving an illumination of one foot-candle) divided by certain constants. A more complete definition of this Brightness metadata value may be obtained from "Exchangeable image file format for digital still cameras: Exif Version 2.2," JEITA CP-3451, Japan Electronics and Information Technology Industries Association (April 2002).

Figure 3:
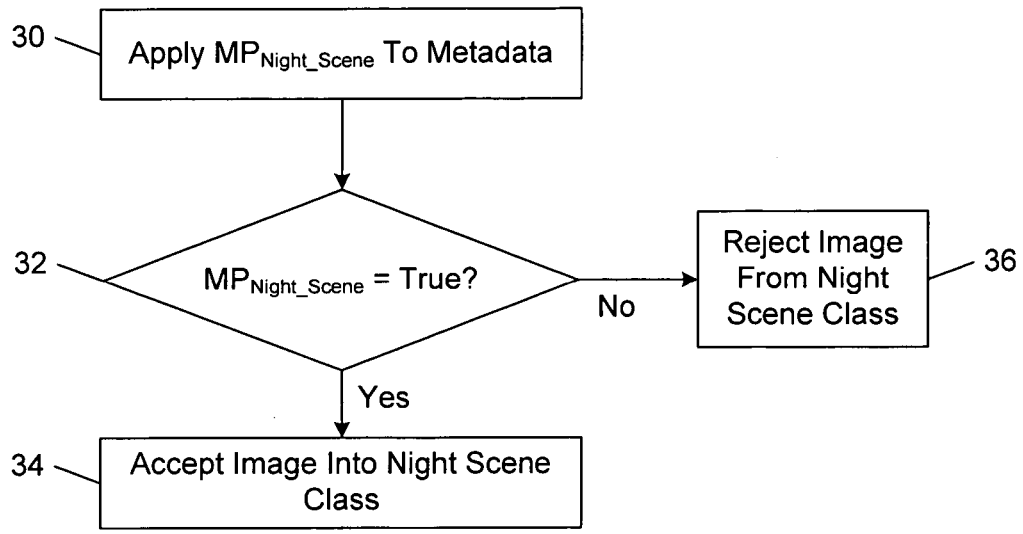
FIG. 3 is a flow diagram of an embodiment of a metadata-based method of classifying images into a night scene class.

FIG. 3 shows an embodiment of a method in accordance with which the metadata-based classifier 12 performs night scene classification of the image 14. The metadata-based classifier 12 applies the night scene metadata predicate ($MP_{Night\_Scene}$) to the metadata 18 (block 30). If $MP_{Night\_Scene}$ is true (block 32), the metadata-based classifier 12 accepts the image 14 into the night scene class (block 34). If $MP_{Night\_Scene}$ is false (block 32), the metadata-based classifier 12 rejects the image 14 from the night scene class (block 36).

The night scene detection results that are achieved based on the metadata predicate $MP_{Night\_Scene}$ depend on the values that are selected for the thresholds $\Omega_A$ and $\Omega_B$. In general, the detection rate increases as the Light_Allowed threshold $\Omega_A$ is decreased and the Brightness threshold $\Omega_B$ is increased. As the detection rate increases, however, the incidence of false positive (Type I error) also increases.

In a first exemplary implementation, the Light_Allowed threshold $\Omega_A$ has a value of 0.2 and the Brightness threshold $\Omega_B$ has a value of 0. In this first exemplary implementation, the metadata-based classifier 12 exhibited a true positive count of 34 and a false positive count of 11 in a population of images containing 56 true night scenes.

In a second exemplary implementation, the Light_Allowed threshold $\Omega_A$ has a value of 0.05 and the Brightness threshold $\Omega_B$ has a value of −3.0. In this second exemplary implementation, the metadata-based classifier 12 exhibited a true positive count of 44 and a false positive count of 12 in a population of images containing 56 true night scenes.

In a third exemplary implementation, the Light_Allowed threshold $\Omega_A$ has a value of 0.0019 and the Brightness threshold $\Omega_B$ has a value of −3.0. In this third exemplary implementation, the metadata-based classifier 12 exhibited a true positive count of 49 and a false positive count of 68 in a population of images containing 56 true night scenes.

D. Metadata-Based Classification of Snow Scenes

With respect to snow scenes, the following metadata predicate ($MP_{Snow\_Scene}$) was identified from an analysis of a population of images:

$$MP_{Snow\_scene} = \{\text{Light\_Allowed} < \Omega_C \text{ and Brightness} > \Omega_D\} \quad (3)$$

where $\Omega_C$ is an empirically determined threshold for the Light_Allowed metadata value and $\Omega_D$ is an empirically determined threshold for the Brightness metadata value. The metadata predicate $MP_{Snow\_Scene}$ that is defined in equation (3) returns a true value for an image X when the Light_Allowed metadata value for X (i.e., Light_Allowed$_X$) is less than $\Omega_C$ and the Brightness value for X (i.e., Brightness$_X$) is greater than $\Omega_D$. Otherwise, the metadata predicate $MP_{Snow\_Scene}$ returns a false value.

The definitions of the Light_Allowed metadata and the Brightness metadata typically are same for both night scene classification embodiments and snow scene classification embodiments. In some implementations, however, one or both of these metadata may be defined differently for night scenes and snow scenes.

Figure 4:
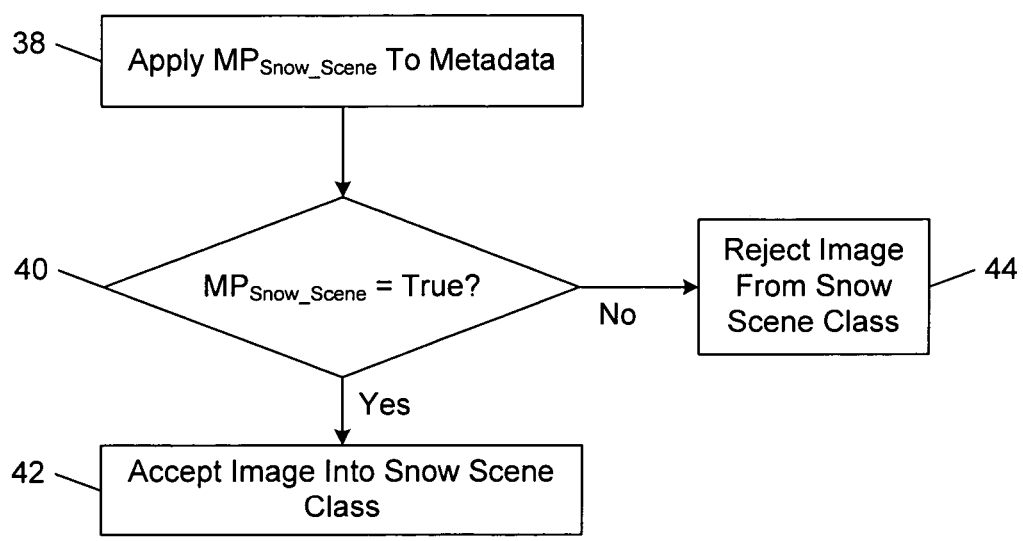
FIG. 4 is a flow diagram of an embodiment of a metadata-based method of classifying images into a snow scene class.

FIG. 4 shows an embodiment of a method in accordance with which the metadata-based classifier 12 performs snow scene classification of the image 14. The metadata-based classifier 12 applies the snow scene metadata predicate ($MP_{Snow\_Scene}$) to the metadata 18 (block 38). If $MP_{Snow\_Scene}$ is true (block 40), the metadata-based classifier 12 accepts the image 14 into the snow scene class (block 42). If $MP_{Snow\_Scene}$ is false (block 42), the metadata-based classifier 12 rejects the image 14 from the snow scene class (block 44).

The snow scene detection results that are achieved based on the metadata predicate $MP_{Snow\_scene}$ depend on the values that are selected for the thresholds $\Omega_C$ and $\Omega_D$. In general, the detection rate increases as the Light_Allowed threshold $\Omega_C$ is increased and the Brightness threshold $\Omega_D$ is decreased. As the detection rate increases, however, the incidence of false positive (Type I error) also increases. In one exemplary implementation, the Light_Allowed threshold $\Omega_C$ has a value of 0.00005 and the Brightness threshold $\Omega_B$ has a value of 11.

III. Scene Classification Based on Metadata and Histogram Data

A. Introduction

As explained above, in some implementations, images are classified in various scene type classes based on both a metadata-based classification result and a histogram-based classification result. It has been observed that the combination of these classification results enables the incidence of correct classification (i.e., the true positive rate) to be increased without unduly increasing the incidence of false positives (Type I error).

Figure 5:
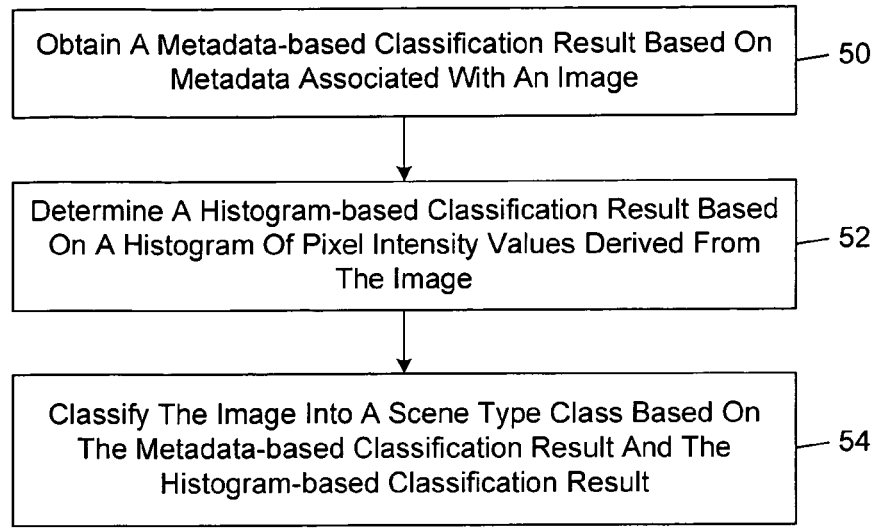
FIG. 5 is a flow diagram of an embodiment of a method of classifying images into a scene type class.

FIG. 5 shows an embodiment of a method of performing scene classification on the image 14 based on metadata and histogram data. In accordance with this method, a metadata-based classification result is obtained based on the metadata 20 that is associated with the image 14 (block 50). A histogram-based classification result is determined based on a histogram of intensity values derived from the image 14 (block 52). The image 14 is classified into a scene type class based on the metadata-based classification result and the histogram-based classification result (block 54).

Figure 6:
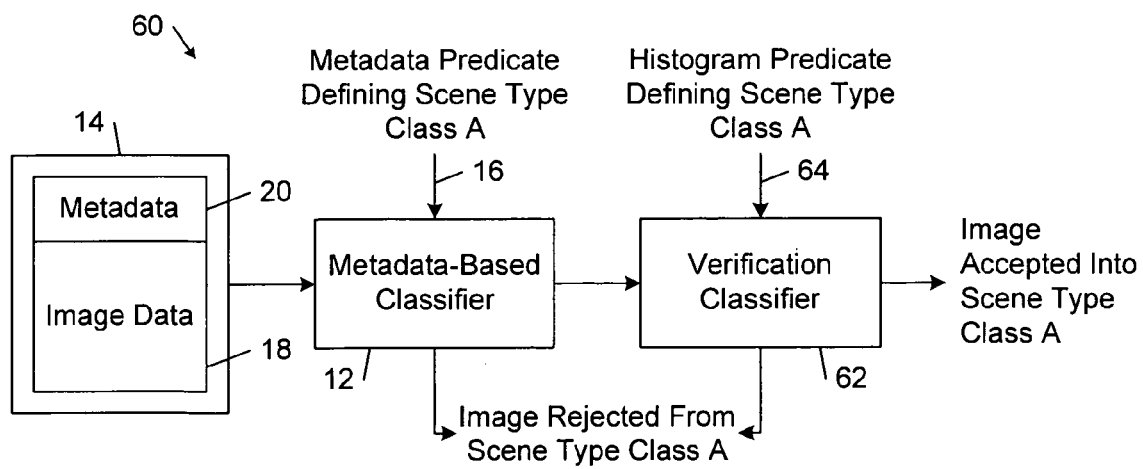
FIG. 6 is a block diagram of an embodiment of a scene classification system that includes a metadata-based classifier and a verification classifier.

FIG. 6 shows an embodiment of a scene classification system 60 that classifies the image 14 in accordance with an implementation of the method shown in FIG. 5. The scene classification system 60 includes the metadata-based classifier 12 and a verification classifier 62. The metadata-based classifier 12 and the verification classifier 62 are not limited to any particular hardware or software configuration, but rather they may be implemented in any computing or processing environment, including in digital electronic circuitry or in computer hardware, firmware, device driver, or software. For example, in some implementations, the metadata-based classifier 12 and the verification classifier 62 may be embedded in the hardware of any one of a wide variety of digital and analog electronic devices, including desktop and workstation computers, digital still image cameras, digital video cameras, printers, scanners, and portable electronic devices (e.g., mobile phones, laptop and notebook computers, and personal digital assistants). In some implementations, computer process instructions for implementing the metadata-based classifier 12, the verification classifier 62, and the data they generate are stored in one or more machine-readable media. Storage devices suitable for tangibly embodying these instructions and data include all forms of non-volatile memory, including, for example, semiconductor memory devices, such as EPROM, EEPROM, and flash memory devices, magnetic disks such as internal hard disks and removable hard disks, magneto-optical disks, and CD-ROM.

In operation, the metadata-based classifier 12 performs an initial classification of the image 14 into a scene type class based on the metadata 18 that is associated with the image 14. In particular, the metadata-based classifier 12 classifies the digital image 14 into the particular scene type class (i.e., scene type class A) that is defined by the metadata predicate 16. The verification classifier 62 verifies the initial classification of the image 14 into the specified scene type class based on a histogram of intensity values that is derived from the image. In the illustrated embodiment, the verification classifier 62 verifies the initial classification of the image based on a histogram predicate 64 that defines the scene type class in terms of at least one condition on the histogram. Each of the metadata-based classifier 12 and the verification classifier 62 determines whether to accept the image 14 into the specified scene type class or to reject the image 14 from the specified scene type class. Only if both the metadata-based classifier 12 and the verification classifier 62 accept the image into the specified scene type class, will the image 14 be classified into the specified scene type class.

In some implementations, the metadata-based classifier 12 performs the same scene type classification on the image 14 as described above in Section II. In other implementations, however, the metadata-based classifier 12 may obtain a metadata-based classification result based on the metadata 20 that is associated with the image 14 in a different way. The verification classifier 62 performs the histogram-based scene type classification verification in the manner that is described in detail in the following section.

B. Scene Type Classification Based on Histogram Predicates

Figure 7A:
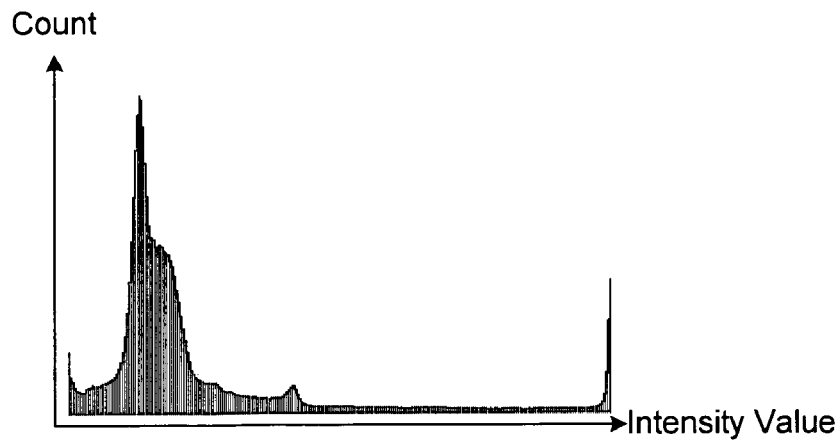
FIGS. 7A-7C are respective graphs of intensity histograms for three representative images of night scenes.
Figure 7B:
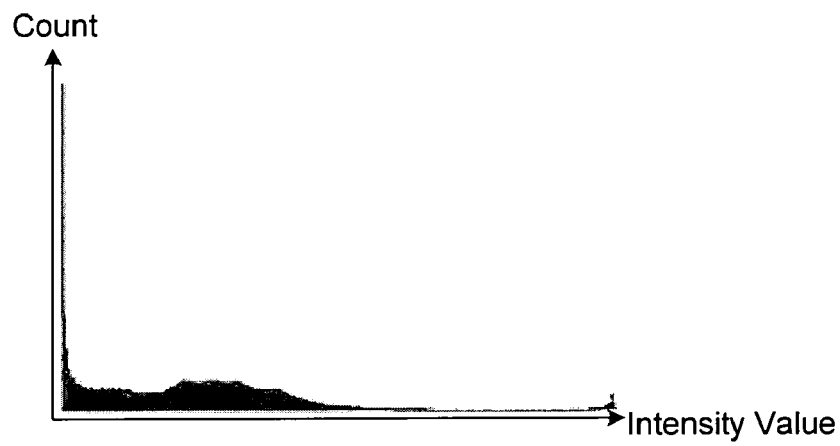
Figure 7C:
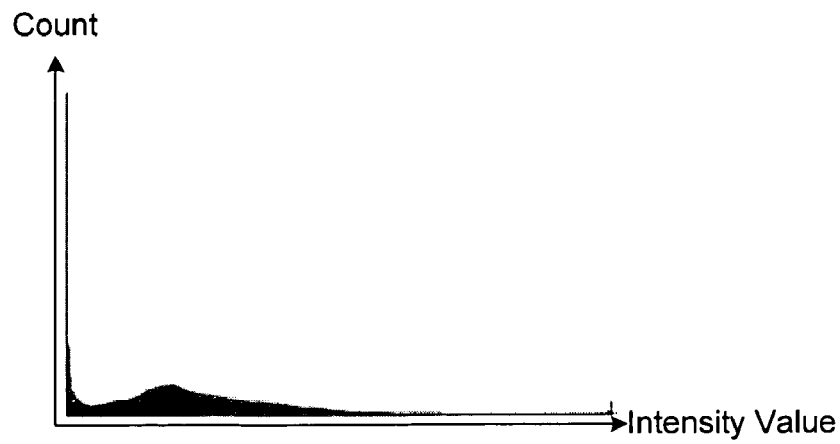

FIGS. 7A-7C are respective graphs of intensity histograms for three representative images of night scenes. Each of these intensity histograms is characterized by peaks in the count near the extremes of the intensity value range and a count profile that is lower in the upper portion of the intensity value range than it is in the mid- to lower portions of the intensity value range.

Based on these observations, histogram predicates were developed to verify the initial classification of images into the night scene class by the metadata-based classifier 12. In general, these histogram predicates apply conditions on the properties or characteristics of one or more portions of the histogram in relation to the corresponding properties or characteristics of other portions of the histogram.

Figure 8:
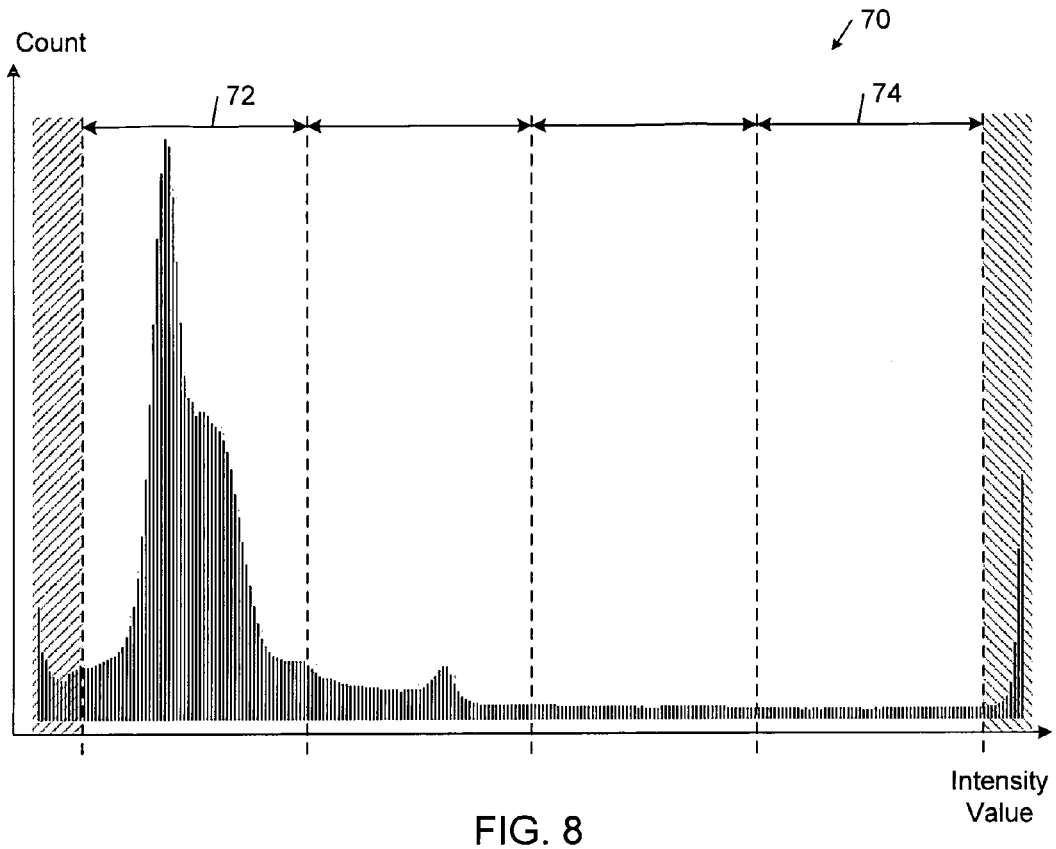
FIG. 8 is a graph of night scene image intensity histogram that has been divided into portions demarcated by dashed lines in accordance with an embodiment of the invention.

FIG. 8 shows a histogram 70 that is divided into portions in accordance with one exemplary implementation of the verification classifier 62. In this implementation, portions of the histogram 70 at the two extremes of the intensity value range are discarded (i.e., ignored). In one example, histogram values at the lowest 5% of the intensity value range and the highest 5% of the intensity value range are discarded. The remaining part of the histogram 70 is divided in N equal portions along the intensity value axis. In FIG. 8, the histogram 70 is divided into four equal portions ranging from a lowest pixel intensity portion 72 to a highest pixel intensity portion 74.

Given the construct illustrated in FIG. 8, the following night scene histogram predicate ($HP_{Night\_Scene}$) was identified from an analysis of a population of images:

$$HP_{Night\_Scene} = \begin{cases} 1. & ave.\text{ count of } P_N \text{ is among the lowest} \\ 2. & ave.\text{ count of } P_N < \Omega_{COUNT} \\ 3. & ave.\text{ total intensity over all portions} < \Omega_{INTENSITY} \end{cases} \quad (4)$$

where $P_N$ is the highest intensity portion 74 of the histogram 70, $\Omega_{COUNT}$ is an empirically determined threshold for the average count of the highest intensity portion 74 of the histogram 70, and $\Omega_{INTENSITY}$ is an empirically determined threshold for the average total intensity of the N portions of the histogram 70.

The first condition specifies that the highest intensity portion 74 of the histogram 70 must have an average count that is among the lowest of the average counts of the other N−1 portions of the histogram 70. The number of portions which may have a lower average count than the highest intensity portion 74 while still satisfying the first condition depends on the value of N. In general, this number tends to be higher for higher values of N. In some implementations, this number is zero (i.e., the highest intensity portion 74 must have the lowest average count in order to satisfy condition 1).

The second condition specifies that the average count of the highest intensity portion 74 of the histogram 70 must be below the threshold $\Omega_{COUNT}$.

The third condition specifies that the average total intensity of the N portions of the histogram 70 must be below the threshold $\Omega_{INTENSITY}$.

The metadata predicate $HP_{Night\_Scene}$ that is defined in equation (4) returns a true value for an image X when all three of the conditions are true. Otherwise, the metadata predicate $MP_{Snow\_Scene}$ Scene returns a false value.

Figure 9:
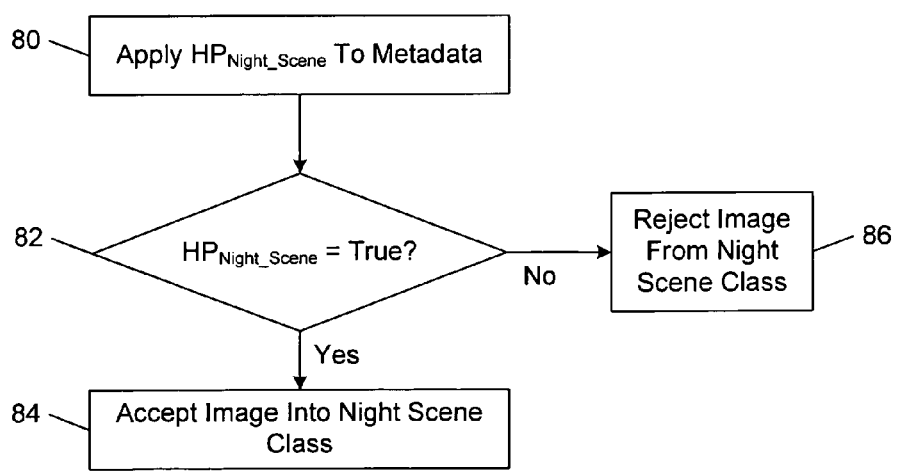
FIG. 9 is a flow diagram of an embodiment of a histogram-based method of classifying images into a night scene class.

FIG. 9 shows an embodiment of a method in accordance with which the verification classifier 62 verifies the initial night scene classification of the image 14 by the metadata-base classifier 12. The verification classifier 62 applies the night scene histogram predicate ($HP_{Night\_Scene}$) to the metadata 18 (block 80). If $HP_{Night\_Scene}$ is true (block 82), the verification classifier 62 accepts the image 14 into the night scene class (block 84). If $HP_{Night\_Scene}$ is false (block 82), the verification classifier 62 rejects the image 14 from the night scene class (block 86).

IV. Exemplary Application Environment

In general, the embodiments that are described above may be implemented in any kind of device or system. Due to their efficient use of processing and memory resources, these embodiments t readily may be implemented in application environments, such as embedded environments, which are subject to significant processing and memory constraints.

Figure 10:
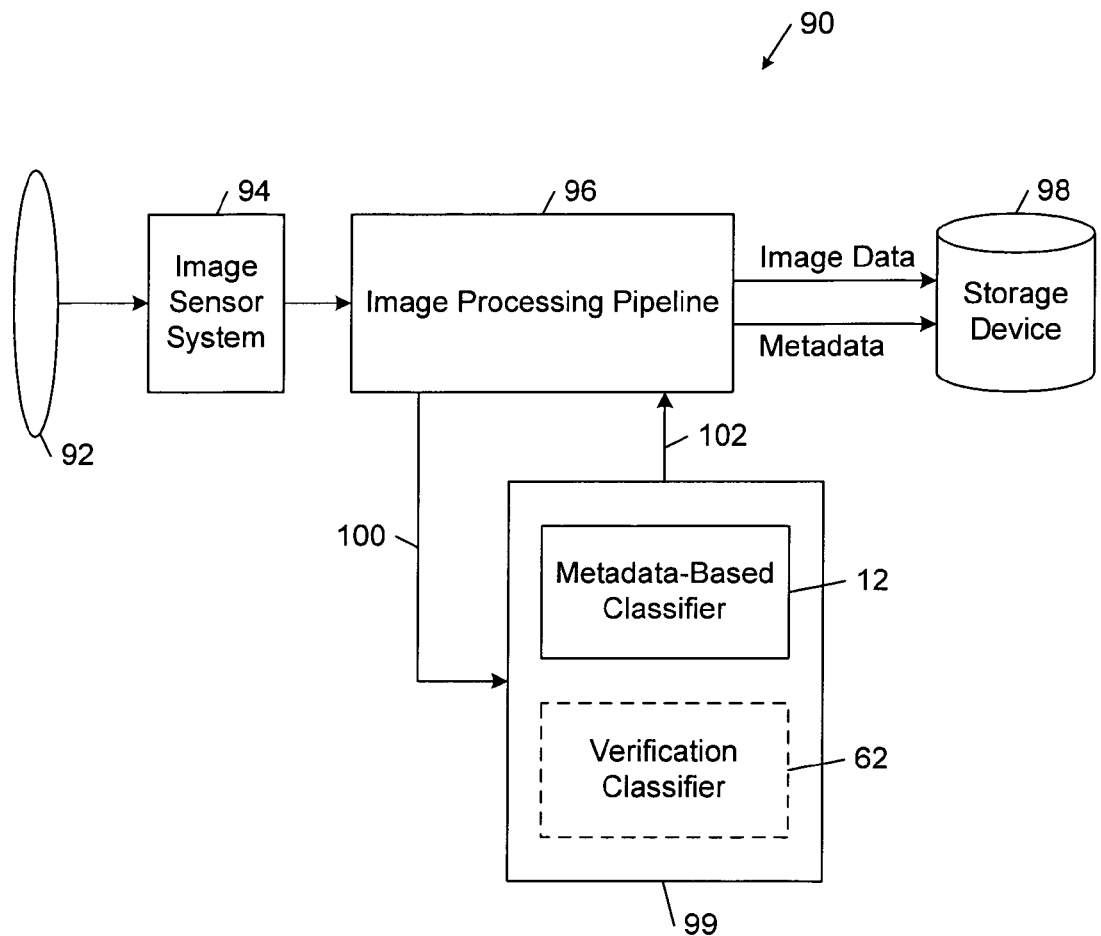
FIG. 10 is a block diagram of an embodiment of an imaging system embodying an embodiment of a scene classification system in accordance with an embodiment of the invention.

FIG. 10 shows an embodiment of a camera 90 (e.g., a digital still image camera or a digital video camera) that includes a lens 92, an image sensor system 94, an image processing pipeline 96, a storage device 98, and a scene classification system 99. The image sensor system 94 includes one or more image sensors (e.g., a charge coupled device (CCD) or a complementary metal-oxide-semiconductor (CMOS) image sensor). The image processing pipeline 96 is implemented by a combination of hardware and firmware components. In some implementations, the image processing pipeline 96 may be divided into a preprocessing module and a post-processing module. The storage device 98 may be implemented by any type of image storage technology, including a compact flash memory card and a digital video tape cassette. The image data stored in storage device 98 may be transferred to another storage device (e.g., a hard disk drive, a floppy disk drive, a CD-ROM drive, or a non-volatile data storage device) of an external processing system (e.g., a computer or workstation).

In operation, light from an object or a scene is focused by lens 92 onto an image sensor of the image sensor system 94, which generates image data. The image processing pipeline 96 may perform a set of front-end operations on the image data, including down-sampling, video demosaicing, color-correction, and generating multiresolution data pyramids. The image processing pipeline 96 also generates compressed image data in accordance with an image compression process (e.g., JPEG, MPEG, or motion-JPEG). The compressed image data are stored in the storage device 98 in the form of one or more discrete image or video files.

The image processing pipeline 96 also generates metadata 100 that is passed to the scene classification system 99. The scene classification system 99 performs scene classification on the image data in accordance with one or more of the scene classification methods described above. The resulting scene classification information is stored in the storage device 98 as scene type metadata 102 together with the metadata 100 and the compressed image data. In some implementations, the metadata 100 and 102 are stored in a header location of the stored image files or in separate files linked to the corresponding image files. The scene type classification meta-data 102 enrich the image data that is stored in the storage device 98. The scene type metadata 102 along with the metadata 100 may be used by suitably-configured tools for searching, browsing, editing, organizing, and managing collections of image files captured by the camera 90. The scene type classification data 102 also may be used to tune certain parameters of the camera 90 based on the detected scene type, or to provide advice to users of the camera 90.

Other embodiments are within the scope of the claims.

What is claimed is:

1. An image processing method, comprising:
   obtaining a metadata-based classification result based on metadata associated with an image, wherein the obtaining comprises initially classifying the image into the scene type class based on a first condition on a first one of the metadata corresponding to a measure of amount of light received in capturing the image and a second condition on a second one of the metadata corresponding to a measure of brightness of the image;
   determining a histogram-based classification result based on a histogram of intensity values derived from the image wherein the determining comprises applying to the histogram a histogram predicate defining the scene type class in terms of multiple conditions on the histogram; and
   classifying the image into a scene type class based on the metadata-based classification result and the histogram-based classification result;
   wherein the obtaining, the determining, and the classifying are performed by computing hardware.

2. The method of claim 1, wherein the obtaining comprises applying to the metadata a metadata predicate defining the scene type class in terms of at least one condition on the metadata.

3. The method of claim 1, wherein the obtaining comprises performing an initial classification of the image into the scene type class based on at least one condition on the metadata and the determining comprises verifying the initial classification of the image into the scene type class based on at least one condition on the histogram.

4. An image processing method, comprising:
   obtaining a metadata-based classification result based on metadata associated with an image, wherein the obtaining comprises performing an initial classification of the image into a scene type class based on at least one condition on the metadata, the obtaining comprises initially classifying the image into the scene type class based on a first condition on a first one of the metadata corresponding to a measure of amount of light received in capturing the image and a second condition on a second one of the metadata corresponding to a measure of brightness of the image, and the obtaining comprises initially classifying the image into a night scene class in response to a determination that the first metadata exceeds a first threshold value and the second metadata is below a second threshold value;
   determining a histogram-based classification result based on a histogram of intensity values derived from the image, wherein the determining comprises verifying the initial classification of the image into the scene type class based on at least one condition on the histogram; and
   classifying the image into the scene type class based on the metadata-based classification result and the histogram-based classification result;
   wherein the obtaining, the determining, and the classifying are performed by computing hardware.

5. The method of claim 4, wherein the verifying comprises confirming the initial classification of the image into the night scene class based at least in pan on a determination that at least one portion of the histogram has a respective property in relation to other portions of the histogram.

6. The method of claim 5, wherein the confirming comprises dividing at least a section of the histogram into different intensity portions ranging from a highest intensity portion to a lowest intensity portion, and determining whether the highest intensity portion of the histogram has an average count that is lower than average frequencies of at least most of the other intensity portions of the histogram.

7. The method of claim 6, wherein the confirming additionally comprises determining whether the average count of the highest intensity portion is below a threshold count value.

8. The method of claim 7, wherein the confirming additionally comprises determining whether a measure of average intensity of the image is below an average intensity threshold.

9. An image processing system, comprising:
memory storing computer process instructions; and
computing hardware coupled to the memory, operable to execute the instructions, and based on the execution of the instructions operable to perform operations comprising
implementing a metadata-based scene type classifier that performs an initial classification of an image into a scene type class based on metadata associated with the image, wherein the metadata-based scene type classifier initially classifies the image into the scene type class based on a first condition in a first one of the metadata corresponding to a measure of amount of light received in capturing the image and a second condition on a second one of the metadata corresponding to a measure of brightness of the image, and
implementing a verification classifier that verifies the initial classification of the image into the scene type class based on application of a histogram predicate to a histogram of intensity values derived from the image, wherein the histogram predicate defines the scene type class in terms of multiple conditions on the histogram.

10. The system of claim 9, wherein the metadata-based scene type classifier initially classifies the image into a night scene class in response to a determination that the first metadata exceeds a first threshold value and the second metadata is below a second threshold value.

11. The system of claim 10, wherein the verification classifier confirms the initial classification of the image into the night scene class based at least in pan on a determination that at least one portion of the histogram has a respective property in relation to other portions of the histogram.

12. The system of claim 11, wherein the verification classifier divides at least a section of the histogram into different intensity portions ranging from a highest intensity portion to a lowest intensity portion, and determines whether the highest intensity portion of the histogram has an average count that is lower than average frequencies of at least most of the other intensity portions of the histogram.

13. The system of claim 12, wherein the verification classifier additionally determines whether the average count of the highest intensity portion is below a threshold count value.

14. The system of claim 13, wherein the verification classifier additionally determines whether a measure of average intensity of the image is below an average intensity threshold.

15. An image processing method, comprising:
applying a first condition on a first one of metadata associated with an image to obtain a first metadata-based classification result, wherein the first metadata corresponds to a measure of amount of light received in capturing the image;
applying a second condition on a second one of the metadata corresponding to a measure of brightness of the image to obtain a second metadata-based classification result; and
classifying the image into a scene type class based on the first and second metadata-based classification results;
wherein the applying of the first condition, the applying of the second condition, and the classifying are performed by computing hardware.

16. The method of claim 15, wherein applying the first condition comprises determining whether the first metadata exceeds a first threshold value, applying the second condition comprises determining whether the second metadata is below a second threshold value, and the classifying comprises classifying the image into a night scene class in response to determinations that the first metadata exceeds the first threshold value and the second metadata is below the second threshold value.

17. The method of claim 15, wherein applying the first condition comprises determining whether the first metadata is below a first threshold value, applying the second condition comprises determining whether the second metadata exceeds a second threshold value, and the classifying comprises classifying the image into a snow scene class in response to determinations that the first metadata is below the first threshold value and the second metadata exceeds the second threshold value.

* * * * *

UNITED STATES PATENT AND TRADEMARK OFFICE
CERTIFICATE OF CORRECTION

PATENT NO. : 7,668,369 B2
APPLICATION NO. : 11/411481
DATED : February 23, 2010
INVENTOR(S) : Jonathan Yen et al.

It is certified that error appears in the above-identified patent and that said Letters Patent is hereby corrected as shown below:

In column 10, line 7, in Claim 1, delete "image" and insert -- image, --, therefor.

In column 10, line 55, in Claim 5, delete "pan" and insert -- part --, therefor.

In column 11, line 35, in Claim 11, delete "pan" and insert -- part --, therefor.

Signed and Sealed this

Sixth Day of July, 2010

David J. Kappos
*Director of the United States Patent and Trademark Office*